United States Patent [19]

Genduso et al.

[11] Patent Number: 5,179,672
[45] Date of Patent: Jan. 12, 1993

[54] APPARATUS AND METHOD FOR MODELING PARALLEL PROCESSING OF INSTRUCTIONS USING SEQUENTIAL EXECUTION HARDWARE

[75] Inventors: Thomas B. Genduso, West Palm Beach, Fla.; Shauchi Ong, Pleasantville, N.Y.

[73] Assignee: International Business Machines Corporation, Armonk, N.Y.

[21] Appl. No.: 540,680

[22] Filed: Jun. 19, 1990

[51] Int. Cl.$^5$ .......................... G06F 9/38; G06F 9/44
[52] U.S. Cl. .................... 395/375; 364/247; 364/270; 364/259; 364/231.8; 364/221.2; 364/232.3; 364/262.4; 364/DIG. 1; 364/488; 364/578; 395/500; 395/550
[58] Field of Search ............... 364/DIG. 1, DIG. 2, 364/488, 578, 200 MS File, 900 MS File; 395/375, 500, 550

[56] References Cited

U.S. PATENT DOCUMENTS

| | | | |
|---|---|---|---|
| 4,231,104 | 10/1980 | St. Clair | 364/900 |
| 4,245,304 | 1/1981 | Porter et al. | 364/200 |
| 4,439,829 | 3/1984 | Tsiang | 364/200 |
| 4,484,266 | 11/1984 | Becker et al. | 364/200 |
| 4,488,229 | 12/1984 | Harrison | 364/200 |
| 4,573,116 | 2/1986 | Ong et al. | 364/200 |
| 4,594,655 | 6/1986 | Hao et al. | 364/200 |
| 4,608,633 | 8/1986 | Boothroyd et al. | 364/900 |
| 4,630,195 | 12/1986 | Hester et al. | 364/200 |
| 4,701,844 | 10/1987 | Thompson et al. | 364/200 |
| 4,766,535 | 8/1988 | Auerbach et al. | 364/200 |
| 4,787,062 | 11/1988 | Nei et al. | 364/900 |
| 4,829,425 | 5/1989 | Bain, Jr. et al. | 364/200 |
| 4,876,644 | 10/1989 | Nuechterlein et al. | 364/200 |
| 4,918,594 | 4/1990 | Onizuka | 395/500 |
| 4,924,429 | 5/1990 | Kurashita et al. | 364/200 |
| 4,937,770 | 6/1990 | Samuels et al. | 364/578 |

OTHER PUBLICATIONS

Zwolinski et al., "The Design of an Hierarchical Circuit-level Simulator", Electronic Design Automation (EDA84), Conference Publication No. 232, pp. 9-12, Mar. 1984.

Lineback J. Robert, "Logic Simulation Speeded with Special Hardware", Electronics Review, Jun. 16, 1982, vol. 55, No. 12, pp. 45-46.

Barto et al., "A Computer Architecture for Digital Logic Simulation, Electronic Engineering", Sep. 1980, vol. 52, No. 643, pp. 35-66.

IBM TDS, vol. 25, No. 1, Jun. 1982 "Logic Processor for Logic Simulation Machine" by M. Denneau pp. 92-94.

*Primary Examiner*—Michael R. Fleming
*Assistant Examiner*—Gopal C. Ray
*Attorney, Agent, or Firm*—Pollock, Vande Sande & Priddy

[57] ABSTRACT

A system for modeling computer instruction execution is disclosed. The public status register holds data representative of the status of the computer processing system. A combinational logic unit receives multibit data words from the public status register, as well as a source of program code. The combinational logic unit produces output data implementing a computer processor. A working status register, connected to the combinational logic unit, receives the combinational logic unit output signals. A clock signal generator, during first and second clock intervals, transfers the data from the working status register to the public status register only after all the combinational logic units have provided their output data for a given set of input data. A second clock interval will clock the public status register contents to the input of the combinational logic unit when a subsequent set of program code is presented to the combinational logic unit.

11 Claims, 2 Drawing Sheets

APPARATUS AND METHOD FOR MODELING PARALLEL PROCESSING OF INSTRUCTIONS USING SEQUENTIAL EXECUTION HARDWARE

BACKGROUND OF THE INVENTION

The present invention relates to systems for modeling computer program execution. Specifically, a system is described which will permit simulating parallel execution of parallel hardware and software by modeling the process using sequentially executed code.

In evaluating the performance of computer programs, specifically those for parallel processing systems, it is desirable to model the computer hardware in order to monitor its performance while executing a program. The model is needed as a tool to understand the performance of the program when being executed by a specific processor architecture. By modeling the computer architecture the execution bottlenecks may be identified and analyzed. Once these problems are analyzed, changes in program code may be implemented to improve the overall program efficiency. The real time performance for executing the program may be measured using the model. The use of such simulation techniques also permits measuring hardware performance, permitting changes to the hardware to be monitored as a result of running the program on a model simulating actual hardware performance.

The simulation of computer hardware using sequential logic configured by sequentially executed computer code is made difficult because of data dependencies. The combinational logic which prefetches, decodes and executes the program instructions is order dependent, requiring that data be processed in a certain order.

The order dependency of sequential combinational logic lengthens the time required to simulate program execution. The time for simulation is a function of $n^2$, where n is the number of logic devices of the combinational logic unit. The length of simulation time necessarily reduces the effectiveness of the computer hardware modeling.

SUMMARY OF THE INVENTION

It is an object of this invention to provide a technique for modeling parallel processing data execution using sequentially configured logic.

It is a more specific object of this invention to provide modeling of parallel processing data execution in a simulated pipeline processor.

It is yet another object of this invention to reduce the simulation time needed to simulate concurrent processing to a linear function of the number of concurrent processing components.

It is still another object of this invention to provide an order independent simulation for concurrent systems.

These and other objects are provided by apparatus and methods in accordance with the invention. The invention provides a means to simulate dynamic code execution of a computer system. The simulation modules are order independent, permitting the execution of code without concern for data dependencies. The simulation time is a linear function of the number of concurrent processing combinational logic components which are configured from sequentially executed computer code.

The invention makes use of a working status register connected to the output of the combinational logic. A clock cycle for the combinational logic is established which identifies the transfer of data from the public status register of the simulated processor to the combinational logic, and the transfer of the settled contents of the working status register to the public status register.

Using the split clock cycle permits the combinational logic circuits to operate sequentially for an entire clock cycle before permitting the public status register contents to be updated. The sequential logic configured from the simulation code therefore cannot be updated and corrupt the public status register with new data values prior to completion of the processing of old data values.

DESCRIPTION OF THE PREFERRED EMBODIMENT

Figure 1:
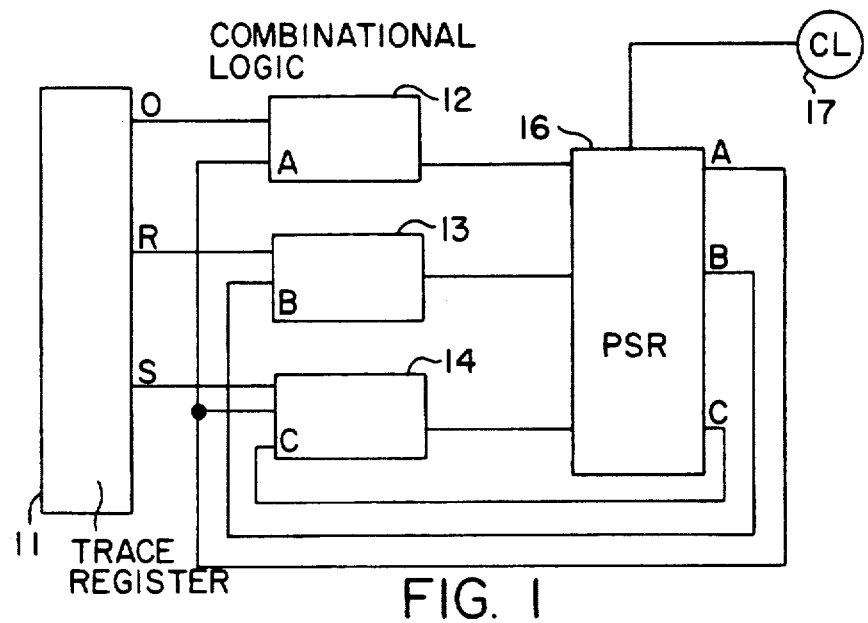
FIG. 1 is a block diagram illustrating order dependent configuration logic for simulating the dynamic activity of processor execution.

Referring to FIG. 1, there is demonstrated combinational logic circuitry, employed in connection with a PSR (public status register) 16 and trace register 11 to simulate a processor. The foregoing processor simulation device includes the combinational logic 12, 13 and 14 for recomputing the status of the machine which is stored in the PSR 16.

Data for which execution is to be simulated is received in the trace register 11. Typically, the trace register 11, when including lines of code for parallel processing, may include up to 100 bytes of information which are applied to combinational logic. The combinational logic shown will usually include many more combinational logic circuits in an operating system than illustrated in FIG. 1.

The combinational logic is sequential in that it is formed by sequentially executing configuration code for simulating the combinational logic unit.

The simulation of the parallel processor execution requires that the data be processed in the combinational logic, and the results used to update the PSR. Each new line of code coming into the trace register 11 is processed by the combinational logic and the status of the processor is continuously updated as reflected in the PSR.

Modeling techniques, due to cost considerations, are typically sequential. The hardware structures which comprise the combinational logic circuits 12, 13 and 14 are generally sequential, and order-dependent. It is clear that both the combinational logic circuits 12 and 14 would require the same value of A from the public status register to compute the new status for the simulated processor. In operating sequentially formed combinational logic, it would therefore be necessary for the sequence of the logic operation to be accounted for, such that the PSR is not updated with a new status for variable A before the combinational logic circuit 12 and 14 have an opportunity to perform their operations on a previous value of A.

Thus, the combinational logic circuit shown in FIG. 1 would have to follow an order wherein the combinational logic circuit 14 would have to perform its function to derive a new value of C prior to the combinational logic circuit 12 performing its function in providing a new value of A. If this order is not observed, and combinational logic circuit 12 provides an output A before logic circuit 14 has computed C, it is clear that the value of A to logic circuit 14 will have changed, thus corrupting the result for the new computation for C.

The foregoing rudimentary example of how combinational logic circuitry is order-dependent illustrates that it may be possible to operate the logic circuits in an order to avoid problems associated with dependency. However, it has been determined that very often combinational logic circuits, which are formed sequentially by executing sequentially lines of configuration code, do not have any sequence which will avoid the foregoing consequence of corrupting PSR values prior to their use by a subsequently-enabled combinational logic circuit.

Other than ordering the combinational logic circuits to avoid the foregoing difficulties, it is possible to employ an order-independent technique by iteration until the output conditions are converged and stabilized. However, the simulation time for doing such iteration is a function of $N^2$ where N is the total combinational logic circuit components. The additional time for doing the simulation is objectionable.

Figure 2:
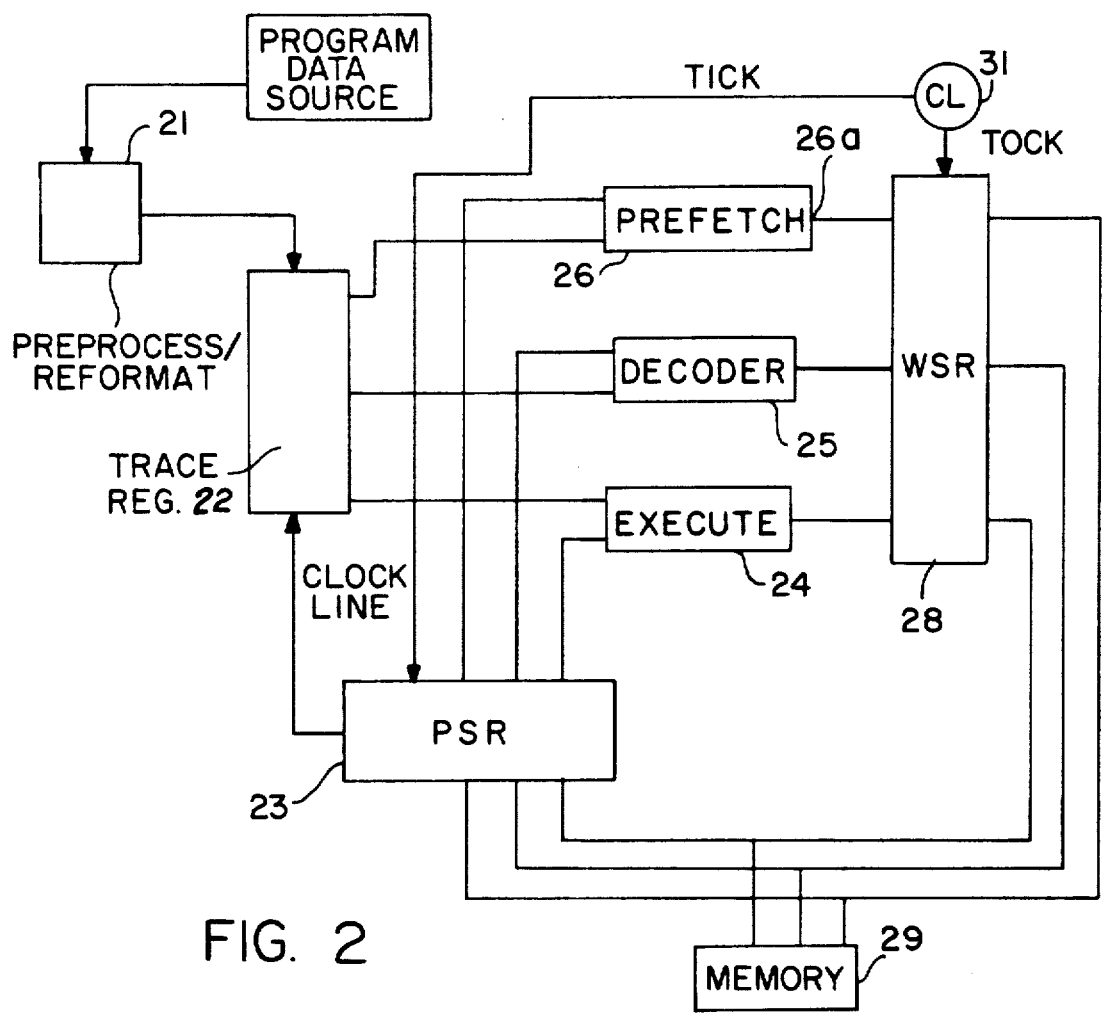
FIG. 2 illustrates a non-order dependent technique for simulating the dynamic activity of parallel processing execution.

FIG. 2 illustrates a technique in accordance with a preferred embodiment of the invention which will provide for the creation of order-independent combinational logic circuits in the context of simulating the execution of parallel programs.

A data source 20 includes lines of code of a program to be executed by a parallel processing system. The data source 20 is connected to a reformat/translation unit 21. Data is transferred from the source 20 to the reformat/translation device 21 where it is decoded. The reformat/translation device 21 will remove any data included which is static data and permit data representing dynamic activity for the parallel processing system to be transferred to the input of the simulation model of FIG. 2. The simulation of parallel execution is confined to monitoring execution of the dynamic portions of the program.

The simulation model includes a trace register 22 which will receive lines of code, under control of the PSR 23, which have been reformatted and translated. The lines of code are presented to combinational logic 24, 25 and 26. This combinational logic 24, 25 and 26 represents a prefetch logic circuit 26, decode logic circuit 25 and execute logic circuit 24. The combinational logic circuits also receive input from the PSR 23 to provide a current status of the execution simulation. The combinational logic circuits are formed by sequentially executing configure code from a program being executed by the simulation processor.

Interposed between the combinational logic and the PSR is a working status register (WSR) 28. The WSR 28 and PSR 23 are clocked by a clock 31 at different ends of an execution sequence for the combinational logic 24, 25 and 26. During the first interval of the sequence, identified by TICK, the PSR 23 contents are transferred to the combinational logic 24, 25 and 26. During the interval following TICK, the prefetch logic 26 provides the results on its output 26a, which is latched into the WSR 28. The decode and execute logic 24 and 25 are sequential, and perform respective decode and execution operations following the prefetch. After three instructions have been introduced into the trace register 22, the prefetch logic 26, decode logic 25 and execute logic 24 are fully engaged in execution of the data, and the outputs 26a, 26b and 26c are transferred to the WSR 28. Thus, a pipelining effect is obtained.

The WSR 28, having latched the results of the combinational logic 24, 25 and 26, will transfer its contents to the PSR 23, at the end of the combinational logic execution sequence, identified by TOCK. The introduction of the WSR 28 will avoid any possibility that the PSR 23 will be prematurely updated with new data before the combinational logic has performed its function with the required previous data in the PSR 23.

The foregoing simulation model is connected via the PSR 23 input signal lines to a memory output 29. The memory output 29 will permit recording of selected data from the WSR 28, thus providing an indication of the performance of the simulation.

Using the foregoing techniques, the combinational logic is order-independent as the data produced from each combinational logic module 24, 25 and 26 are maintained in the WSR 28 until the sequence is completed. At this point, it is possible to transfer the results in the WSR 28 to the PSR 23 such that the status for the simulation device may be updated. The transfer of combinational logic results from the WSR register 28 is followed by a clocking of the trace register 22 such that more conditioned parallel data is available for each of the combinational logic circuits 24, 25 and 26.

It is therefore seen that by providing a clock sequence for the simulation device which permits the combinational logic to complete all logical functions before transferring the result to the PSR 23, an essentially order-independent system results, with time of execution a linear function of the number of elements in the combinational logic.

Figure 3A:
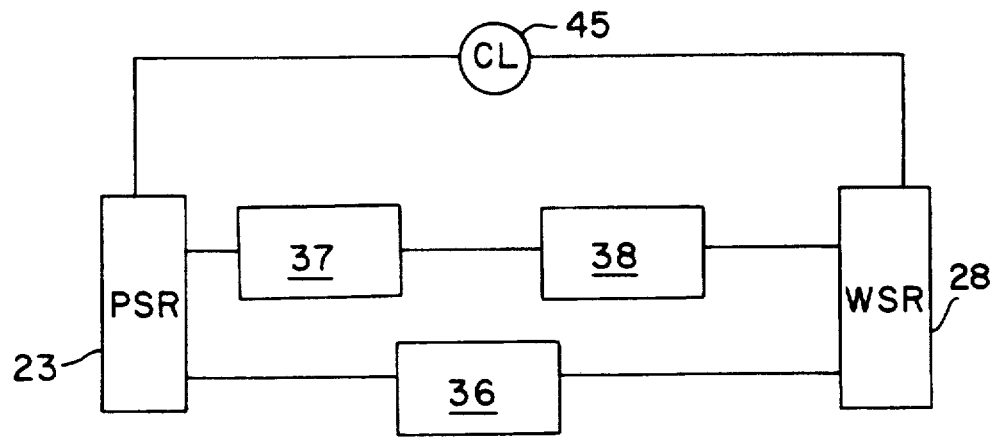
FIGS. 3A and 3B illustrate the use of multiple clock cycles for combinational logic which models a subfunctional component as a subset of a clock cycle.
Figure 3B:
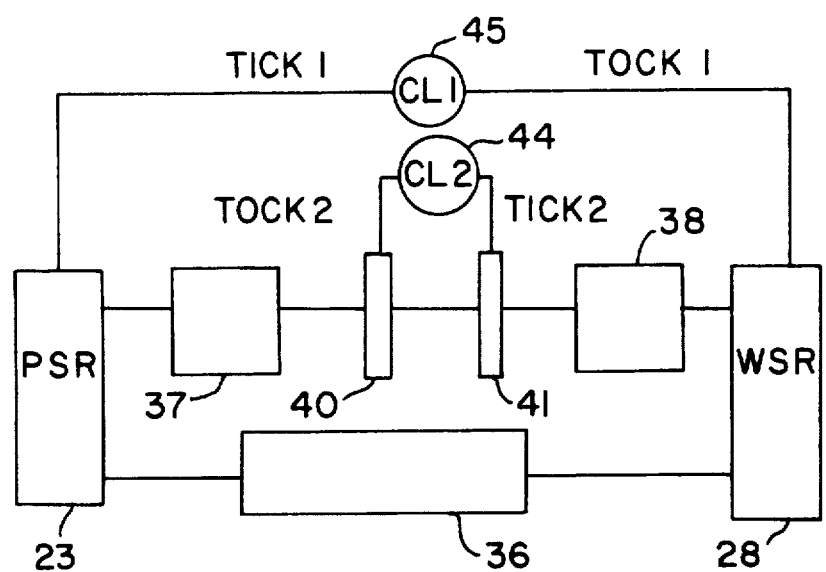

Referring now to FIGS. 3A and 3B, there is shown an example of a simulation using multiple cycles for independent function simulation. Specifically, functions 36, 37 and 38 of FIG. 3A may be independently simulated, and their results preserved. FIG. 3A illustrates how the three functions, 36, 37 and 38 may be modeled, using a single clock 45, providing an interval corresponding to the combinational logic execution time beginning with TICK 1 and ending with TOCK 1. FIG. 3B illustrates the modeling of the same functions wherein a WSR 40 and a second PSR 41 are interposed between logic functions 37 and 38. The clock sequences for each of these clocks 44 and 45 are shown more particularly in FIG. 3B. FIG. 3B indicates that the sequence for clocking the respective PSR and WSR registers is

TICK 1 TOCK 2 TICK 2 TOCK 1.

Following the foregoing sequence, using the clock 45 and subclock 44, it is possible to preserve the outputs from each of the logic circuits 37 and 38 independently.

Thus, there is described a system which will permit modeling of the dynamic activity of a computer program execution. The technique provides for order-independent simulation of the processor execution, thereby increasing the speed of simulation.

Having thus described our invention, what we claim as new and desire to secure by Letters Patent is:

1. A method for simulating simultaneous execution of instructions with sequential combinational logic comprising:

establishing a clock cycle period for an execution sequence to be modeled;

storing said instructions which are to be simultaneously executed;

dividing said clock cycle into first (TICK) and second (TOCK) portions;

establishing combinational logic circuits implementing prefetch logic, decode logic and execution logic which receive on first inputs thereof said stored instructions;

transferring data from a public status register to second inputs of said combinational logic during said first (TICK) portion, said combinational logic producing logical operations on said transferred data; and, transferring data obtained from said logical operations during said second (TOCK) portion, from said combinational logic circuits to said public status register, whereby during a whole clock cycle a parallel transfer and execution by said combinational logic circuits results.

2. The method of claim 1 further comprising:

reading data during the TICK portion of said clock cycle from a public status register to said combinational logic, and writing logic function results from said combinational logic to a working status register; and, reading from said working status registers, during said second TOCK portion, and writing said read data to said public status registers.

3. A method for modeling parallel processing of instructions using sequential execution hardware comprising:

providing first, second and third combinational logic circuits, implementing a prefetch function, decode function and execution function, said combinational logic circuits receiving on first inputs thereof parallel processing execution instructions;

providing first, second and third public status register outputs from a public status register for transferring data to second inputs of said combinational logic circuits;

providing first, second and third working status register inputs from a working status register for receiving the data results produced by said combinational logic circuits; and, providing means for dividing a clock cycle into first and second clock portions, said first portion transferring data from said public status register output to said combinational logic and writing results from said combinational logic circuits to said working status register inputs, and during a second portion of said clock cycle, transferring data from said working status register to said public status registers, whereby instructions may be prefetched, decoded and executed sequentially over a time interval defined by a single clock cycle.

4. An apparatus for modeling parallel processing of instructions in a sequential execution system comprising:

a trace register for providing a series of multidigit codes representing data which is produced during parallel processing;

a combinational logic circuit for receiving each bit of said multidigit code, said logic circuit having a plurality of logic outputs for sequentially performing logical functions on said multidigit codes;

a working status register having a plurality of inputs connected to said combinational logic circuit outputs;

a public status register having a plurality of input lines connected to said working status register outputs and a plurality of outputs connected to a like number of inputs of said combinational logic circuit; and, a clock circuit for identifying the beginning of an interval in which subcircuits of said combinational logic circuit sequentially calculate a new set of logic output signals, and identifying the end of said interval, said clock circuit initiating transfer of the contents of said public status register to said combinational logic, and transferring the contents of said working status register to said public status register at the end of said interval, whereby transitional data produced by said combinational logic circuit during said interval does not reach said public status register.

5. The apparatus of claim 4 wherein said combinational logic circuit simulates an instruction prefetch operation, decode operation and execution operation.

6. The apparatus of claim 5 wherein said combinational logic circuit outputs performing a prefetch operation are applied by said working status register to inputs of said public status register which connects to a portion of said combinational logic circuit simulating said decode operation.

7. The method of claim 6 wherein said combinational logic circuit outputs representing a decode operation are applied by said working station registers to inputs of said public status register which connect to a portion of said combinational logic circuit representing said execution operation.

8. A system for modeling computer instruction execution comprising:

a public status register for holding data representative of the status of a computer processing system;

a trace register for storing multidigit binary data representing processing data produced by a computer processing program;

a combinational logic unit for receiving multibit data words from said public status register and said trace register, said combinational logic unit producing output data over a sequential computational interval;

a working status register connected to said combinational logic unit for receiving output data sequentially produced by said combinational logic unit, and transferring data in response to a clock signal to said public status register; and, a clock signal generator for generating first and second clock signals for defining said computational interval, said first clock signal being applied to said public status register to transfer its contents to the combinational logic, and said second clock signal representing the end of said computation interval, enabling said working status register to transfer the data to said public status register when said computational interval is completed.

9. A system for modeling processing instruction execution according to claim 8, wherein said combinational logic unit comprises:

a section representing a prefetch unit of a parallel processing system;

a section representing a decoding unit of a parallel processing system; and, a section representing an execution unit of a parallel processing system.

10. The system of claim 9 wherein said section representing said prefetch unit provides output data connected to an input section of said section representing a decoding unit via said working station register and said public status register, whereby said prefetch unit output data is transferred to said public status register and thereby to said combinational logic unit decode section.

11. The system of claim 10 wherein said section representing said decode unit provides data to an input section of said section representing said execution unit via said working status register, whereby said section representing said decode unit output data is transferred to said public status register, and thence to said combinational logic section representing an execution unit.

* * * * *